UNITED STATES PATENT OFFICE.

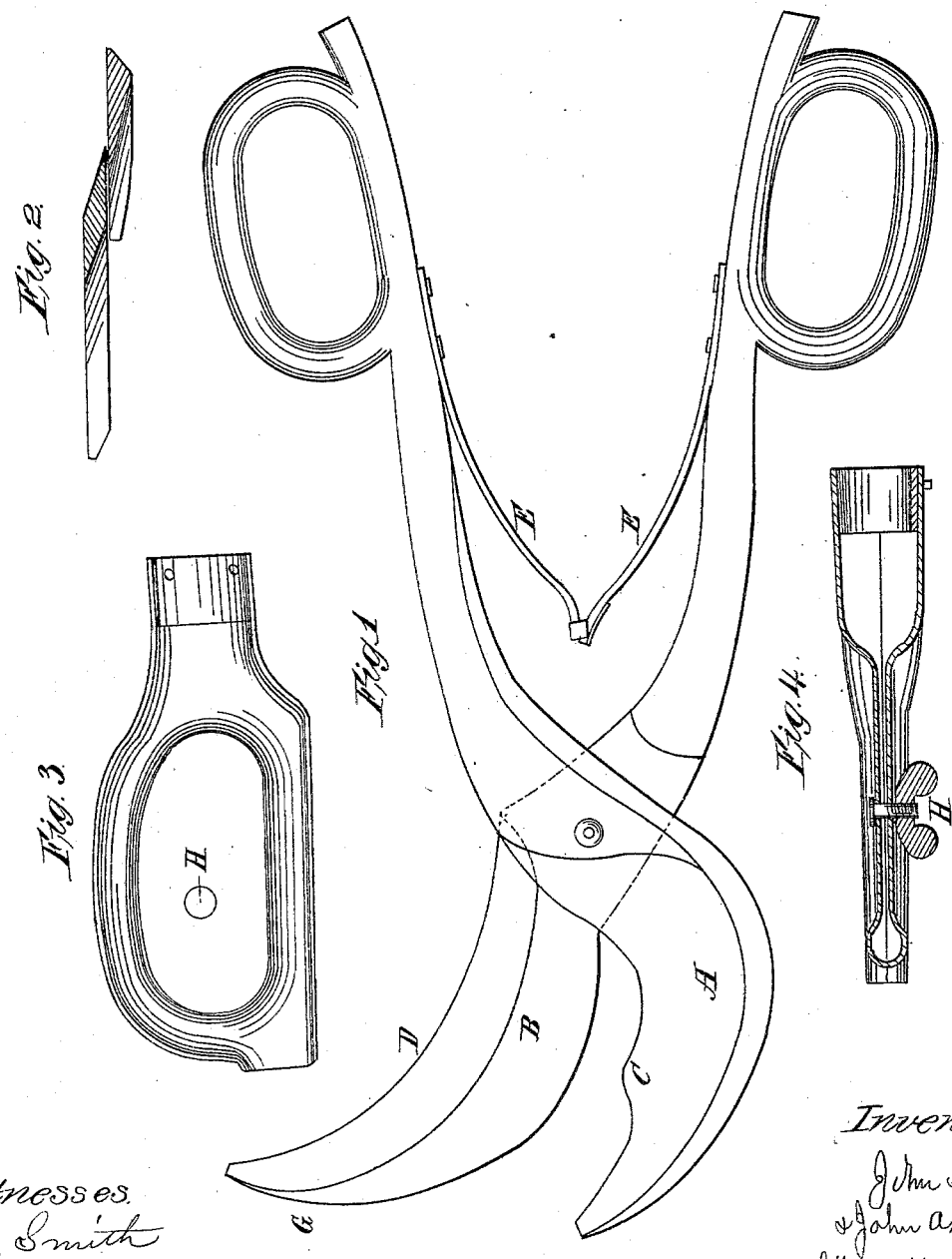

JOHN SPEAR AND JOHN A. HULL, OF CARBONDALE, ILLINOIS.

IMPROVEMENT IN PRUNING SHEARS AND KNIFE.

Specification forming part of Letters Patent No. 78,615, dated June 2, 1868.

*To all whom it may concern:*

Be it known that we, JOHN SPEAR and JOHN A. HULL, of Carbondale, in the county of Jackson and State of Illinois, have invented a new and valuable Improvement in Combined Pruning Shears and Knife; and we do hereby declare that the following is a full, clear, and exact description of the construction and operation of the same, reference being had to the annexed drawings, making a part of this specification, and to the letters and figures of reference marked thereon.

The object of our invention is to provide a more perfect tool than has heretofore been known or used for pruning and trimming trees and shrubs. To this end we construct an instrument in the form shown on Figure 1 of the drawings. It consists of shears with both blades bent in the same direction in the form of hooks. These shear-blades are marked, respectively, A and B.

Letter C represents the sharp edge of blade A, which is formed in a double curve, $a$ $a$, by the projection marked C. Letter D shows the lower or hooked edge of blade B. This is made sharp, and is adapted for use as a hook or knife. The letters E are two springs, united in the manner shown, which serve to force the handles of the shears apart. The shear-edge of blade B extends to its extreme point. That portion which extends beyond the edge of blade A is used as a chisel. We have marked this chisel G on the drawings.

In addition to the above devices we construct for use therewith a clasp fitted to the handle of the shears. This clasp is made of two pieces of metal in the form shown in Figs. 3 and 4. It is joined and held together by a bolt, nut, and screw, as shown at H, and has a socket adapted to receive the end of a pole, and thereby enabling the operator to use the shears, knife, or chisel at any desirable distance from the ground.

What we claim as our invention, and desire to secure by Letters Patent, is—

1. The shears consisting of the double-curved blade C, the blade B, with the projecting thrust-cutting edge or chisel G, and the curved edge D, arranged as described.

2. In combination with the pruning-shears herein described, the clasp, Figs. 3 and 4, constructed and operating substantially as specified.

JOHN SPEAR.
JOHN A. HULL.

Witnesses as to Spear:
W. A. SANDERS,
S. W. SPILLER.

Witnesses as to Hull:
J. C. SMITH,
A. G. CRYLMUN.